US009388349B2

(12) United States Patent
Koyama et al.

(10) Patent No.: US 9,388,349 B2
(45) Date of Patent: Jul. 12, 2016

(54) CHAR RECOVERY SYSTEM AND CHAR FEEDING HOPPER

(75) Inventors: Yoshinori Koyama, Tokyo (JP);
Yasunari Shibata, Tokyo (JP); Osamu Shinada, Tokyo (JP); Katsuhiko Yokohama, Tokyo (JP); Taketoshi Sakae, Tokyo (JP); Koji Nishimura, Tokyo (JP); Naoto Nakayama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 142 days.

(21) Appl. No.: 14/237,378

(22) PCT Filed: Aug. 10, 2012

(86) PCT No.: PCT/JP2012/070548
§ 371 (c)(1),
(2), (4) Date: Feb. 6, 2014

(87) PCT Pub. No.: WO2013/024827
PCT Pub. Date: Feb. 21, 2013

(65) Prior Publication Data
US 2014/0250786 A1    Sep. 11, 2014

(30) Foreign Application Priority Data

Aug. 15, 2011  (JP) ................................. 2011-177661
Feb. 24, 2012  (JP) ................................. 2012-038948

(51) Int. Cl.
*C10K 1/02*     (2006.01)
*G01F 23/288*   (2006.01)
*C10J 3/50*     (2006.01)
*C10J 3/72*     (2006.01)

(52) U.S. Cl.
CPC . *C10K 1/02* (2013.01); *C10J 3/506* (2013.01); *C10K 1/026* (2013.01); *G01F 23/288* (2013.01);

(Continued)

(58) Field of Classification Search
CPC combination set(s) only.
See application file for complete search history.

(56) References Cited

U.S. PATENT DOCUMENTS 3,582,647 A * 6/1971 Figuet et al. ..................... 378/52
5,078,011 A * 1/1992 Morkun et al. ................. 73/599

(Continued)

FOREIGN PATENT DOCUMENTS

JP    62-47521    3/1987
JP    10-221274   8/1998

(Continued)

OTHER PUBLICATIONS

International Search Report issued Oct. 23, 2012 in International (PCT) Application No. PCT/JP2012/070548.

(Continued)

*Primary Examiner* — Matthew Merkling
(74) *Attorney, Agent, or Firm* — Wenderoth, Lind & Ponack, L.L.P.

(57) ABSTRACT

The present invention includes: a char feeding hopper body that feeds separated char toward a coal gasifier; a char communicating tube that communicates with a bottom portion of the char feeding hopper body and extends in a vertical axis direction; fluid gas feeding means that is provided at a bottom portion side of the char feeding hopper body and feeds fluid gas to an inside thereof; a radiation source section that emits γ-rays toward an inside of the char communicating tube in which the level of the char reaches a level $H_2$ which is the same level as a level $H_1$ of the char in the char feeding hopper as a result of feeding of the fluid gas; and a γ-ray detector that is provided along a vertical axis direction of the char communicating tube and detects the emitted γ-rays.

5 Claims, 11 Drawing Sheets

(52) U.S. Cl.
CPC ............. G01F 23/2885 (2013.01); *C10J 3/723* (2013.01); *C10J 2200/156* (2013.01); *C10J 2300/093* (2013.01); *C10J 2300/094* (2013.01); *C10J 2300/0959* (2013.01); *C10J 2300/0976* (2013.01); *C10J 2300/1653* (2013.01); *C10J 2300/1678* (2013.01); *C10J 2300/1807* (2013.01); *Y02E 20/18* (2013.01)

(56) References Cited

U.S. PATENT DOCUMENTS

| | | | |
|---|---|---|---|
| 5,882,477 A * | 3/1999 | Laakso et al. | 162/63 |
| 6,310,929 B1 * | 10/2001 | Hirukawa | 376/245 |
| 2006/0000721 A1 * | 1/2006 | Naito et al. | 205/637 |
| 2007/0137169 A1 | 6/2007 | Ishigami et al. | |
| 2010/0302089 A1 | 12/2010 | Nistor et al. | |
| 2012/0234511 A1 * | 9/2012 | Greenwood | 162/19 |

FOREIGN PATENT DOCUMENTS

| | | |
|---|---|---|
| JP | 11-106761 | 4/1999 |
| JP | 3054788 | 6/2000 |
| JP | 2000-248284 | 9/2000 |
| JP | 2002-013973 | 1/2002 |
| JP | 3652848 | 5/2005 |
| JP | 2006-063098 | 3/2006 |
| JP | 2009-52800 | 3/2009 |
| JP | 2011-116979 | 6/2011 |

OTHER PUBLICATIONS

Chinese Office Action issued Sep. 19, 2014 in corresponding Chinese Patent Application No. 201280035781.7 with English translation.

Written Opinion of the International Searching Authority issued Oct. 23, 2012 in International (PCT) Application No. PCT/JP2012/070548.

Decision of a Patent Grant issued Nov. 17, 2015 in corresponding Japanese Patent Application No. 2012-038948 (English Translation).

Notification of Completion of Formalities for Registration issued Apr. 6, 2016 in corresponding Chinese Patent Application No. 201280035781.7 with English translation.

Notification of Grant of Invention Patent Right issued Apr. 6, 2016 in Chinese Patent Application No. 201280035781.7 with English translation.

* cited by examiner

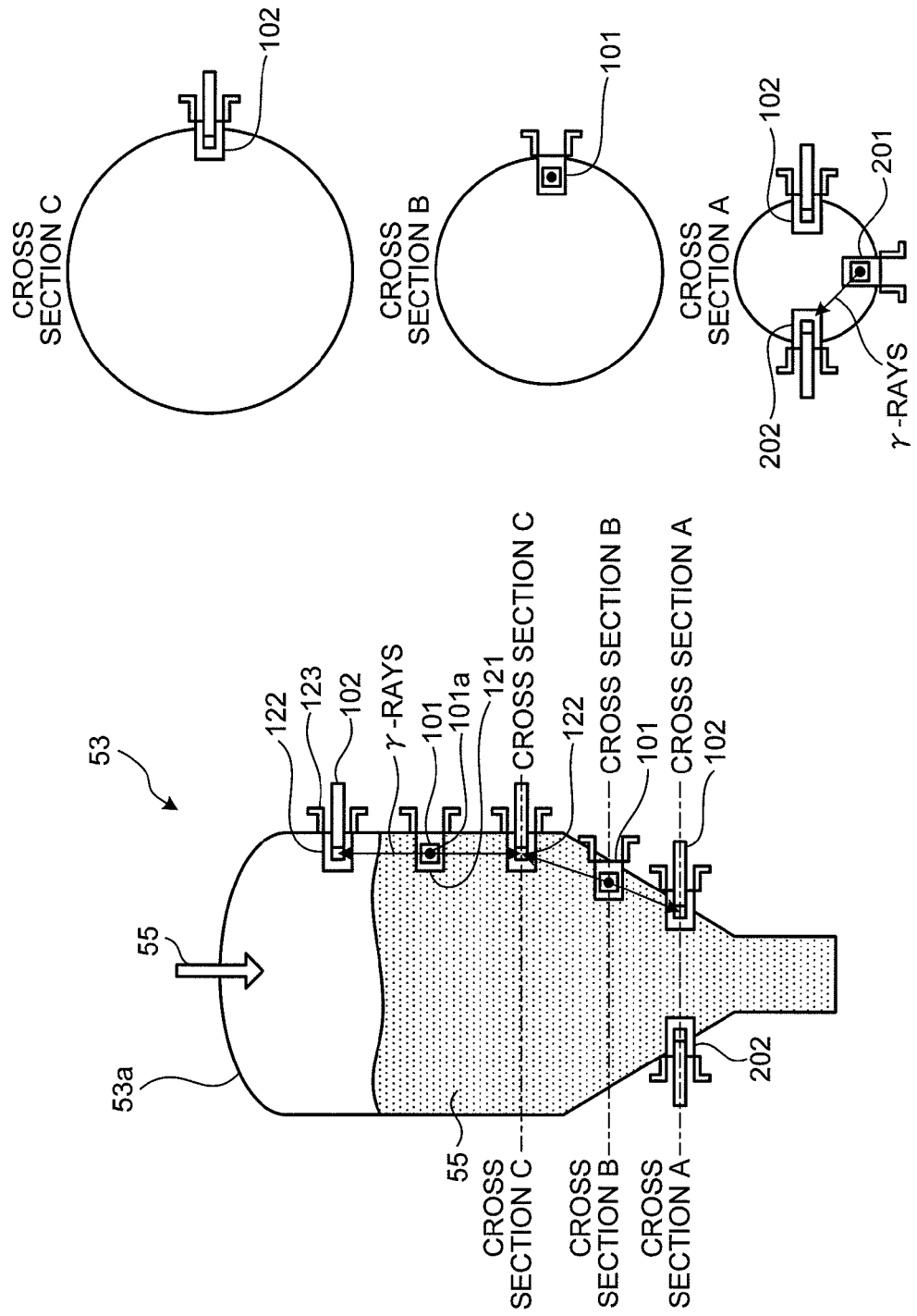

CHAR RECOVERY SYSTEM AND CHAR FEEDING HOPPER

FIELD

The present invention relates to a char recovery system and a char feeding hopper which are used in a carbonaceous feedstock gasification facility.

BACKGROUND

The carbonaceous feedstock gasification facility is a facility that converts carbonaceous feedstock into gas mainly containing CO, $H_2$, and the like by gasifying agent containing oxygen, steam, or the like.

A conventional carbonaceous feedstock gasification facility generally includes a carbonaceous feedstock feeding system, a gasifier, and a char recovery system. The carbonaceous feedstock is fed to the gasifier by carrier gas such as nitrogen and receives gasifying agent (air, oxygen-enriched air, oxygen, steam, etc.). Then, in the gasifier, the carbonaceous feedstock is subjected to gasification under combustion to generate product gas (combustible gas). The product gas is fed to the char recovery system, where unreacted carbon-containing feedstock (char) is removed.

The char recovery system in the carbonaceous feedstock gasification facility removes, from the product gas generated in the gasifier, the char contained in the product gas using a plurality of stages of precipitators. The recovered char is returned, in increments of a prescribed amount, to the gasifier by a char feeding unit. That is, a bin system is used here. A common bin system includes a single (or plurality of) bin, a plurality of char discharge lines that discharge the char recovered by the precipitators into the bin, and a plurality of char feeding lines that feed the char recovered in the bin to a plurality of (or a single) hoppers.

There are known, as the conventional char recovery system, those described in Patent Literatures 1 to 3 described below.

By the way, in order to respond to an increase in an amount of aeration gas due to an increase in plant capacity, the char recovery system needs to be provided in plural numbers. Further, the char feeding hopper also needs to be provided in plural numbers in order to respond to an increase in char flow rate due to the increase in plant capacity.

Further, in order to ensure reliability of each unit, the number of, e.g., hopper configurations needs to be increased from two (minimum required number) to three, four, . . . .

In order to achieve the above hopper configuration, it is necessary to connect the char recovery system and a char bin for storing the char from char separation means by a delivery tube.

Sometimes, a valve is installed between the char recovery system and char bin. In this case, a gate valve and an air-tight valve need to be connected to a char bin outlet and a feeding hopper inlet, respectively. Further, an expansion joint is installed in order to absorb thermal elongation between the hoppers.

The char recovered by the char recovery system is fed to the char feeding hopper and is then reintroduced into the gasifier with hopper pressure made higher than gasifier pressure by a specified value.

In order to perform operation control so as to substantially balance between an amount of recovered char and a feeding amount of the char in the reintroduction of the recovered char into the gasifier, a load cell is installed in all the char feeding hoppers to measure a char weight.

CITATION LIST

Patent Literature

Patent Literature 1: Japanese Patent No. 3054788
Patent Literature 2: Japanese Patent No. 3652848
Patent Literature 3: Japanese Laid-open Patent Publication No. 2006-063098
Patent Literature 4: Japanese Laid-open Patent Publication No. 2002-013973

SUMMARY

Technical Problem

However, the weight of the char to be measured is considerably smaller than a weight of the char feeding hopper itself, so that high measurement accuracy is required.

For the weight measurement, an expansion joint is installed on a connecting tube between the char bin and char feeding hopper.

Further, in order to increase the measurement accuracy, device/control means, such as a pressure balancing type expansion joint for absorbing reactive force by hopper pressure and a load and the like caused due to a difference in expansion amount between the hoppers and performing correction and measurement, is employed (Patent Literature 4).

Assuming that a receiving amount of the char is 50 t/h, a pressure vessel is required. Thus, a char feeding hopper having a thickness of 10 cm, a diameter of 5.5 m, a height of about 8 m and a weight of about 160 t is required, and an external force applied to a joint is as large as 80 t. However, a weight of the char to be measured is as considerably small as 1.3 kg/0.1 sec. (13 kg/sec), and this needs to be measured accurately.

Accordingly, when the char is measured by weight, a large device configuration and a highly accurate measurement technique are required. Thus, there is a significant need to perform measurement of the char to be fed to the char feeding hopper by a method other than the weight measurement in anticipation of a future increase in size of the gasifier.

In view of the above problem, an object of the present invention is to provide a char recovery system and a char feeding hopper capable of easily performing measurement of the char.

Solution to Problem

According to a first aspect of the present invention in order to solve the above problems, there is provided a char recovery system for recovering char from product gas, the char being an unreacted carbonaceous raw material and the product gas being generated by gasification of the carbonaceous raw material in a gasifier, the char recovery system including: separation means for separating the char from the product gas; a char bin for recovering the separated char; a char discharge line for feeding the recovered char to at least one char feeding hopper; and a char feeding line for feeding the char from the char feeding hopper toward the gasifier, wherein measurement of a char amount (feeding amount/discharge amount) in the char feeding hopper is performed by volume measurement that measures a space deposition amount.

According to a second aspect of the present invention, there is provided the char recovery system according to the first aspect, wherein a volume of the char is measured by means of a level meter using radiation.

According to a third aspect of the present invention, there is provided the char recovery system according to the second aspect, wherein the level meter includes: a radiation source section for emitting γ-rays; and a γ-ray detector for detecting the emitted γ-rays.

According to a fourth aspect of the present invention, there is provided the char recovery system according to the second or third aspect, further including a reference level meter for correcting, in measurement using the level meter, the char amount measured using the level meter based on a fluidized state of the char or a type of the carbonaceous raw material.

According to a fifth aspect of the present invention, there is provided a char feeding hopper including: a char feeding hopper body for feeding separated char toward a gasifier; a communicating tube for communicating with a bottom portion of the char feeding hopper body, the communicating tube extending in a vertical axis direction; fluid gas feeding means provided at a bottom portion side of the char feeding hopper body, for feeding fluid gas to an inside thereof; a radiation source section for emitting γ-rays toward an inside of the char communicating tube in which a level of the char reaches the same level as a level of the char in the char feeding hopper body as a result of feeding of the fluid gas; and a γ-ray detector provided in the vertical axis direction of the char communicating tube, for detecting the emitted γ-rays.

According to a sixth aspect of the present invention, there is provided a char feeding hopper including: a char feeding hopper body for feeding separated char toward a gasifier; a first casing tube inserted into the char feeding hopper body through a side wall thereof; a radiation source section provided in the first casing tube, for emitting γ-rays toward an inside of the char feeding hopper body; a second casing tube provided at least above or below the first casing tube in a vertical axis direction thereof and inserted into the char feeding hopper body through the side wall thereof; and a γ-ray detector provided in the second casing tube, for detecting the emitted γ-rays.

According to a seventh aspect of the present invention, there is provided the char feeding hopper according to claim the six aspect, further including cooling means in each of the first and second casing tubes.

According to an eighth aspect of the present invention, there is provided the char feeding hopper according to the fifth aspect, wherein a plurality of sets of the γ-ray radiation source section and γ-ray detection section are installed vertically along the char communicating tube, among the plurality of sets of the γ-ray radiation source section and γ-ray detection section, a set thereof on an introduction side of fluid gas is used for constituting a reference measurement level meter, and a char measurement area of the reference measurement level meter is always filled with the char.

According to a ninth aspect of the present invention, there is provided the char feeding hopper according to the fifth or the sixth aspect, wherein a reference measurement level meter including a set of the γ-ray radiation source section and γ-ray detection section is installed at a lower portion in the char feeding hopper body, and a char measurement area between the γ-ray radiation source section and γ-ray detection section is always filled with the char.

Advantageous Effects of Invention

According to the present invention, not by measuring the weight of the char feeding hopper of the char recovery system using a load cell, but by measuring the volume (level) of the char, it is possible to reintroduce the char into the gasifier with a simple char feeding unit configuration while keeping a total char volume in a char system constant.

BRIEF DESCRIPTION OF DRAWINGS

FIG. 16 is a schematic view of another char feeding hopper according to the fourth embodiment.

DESCRIPTION OF EMBODIMENTS

Hereinafter, the present invention will be described in detail with reference to the drawings. The present invention is not limited by the embodiment described below. When there are a plurality of embodiments, the present invention includes an embodiment obtained by combining the respective embodiments. Further, constituent elements in the embodiments include those that can be easily assumed by those skilled in the art or that are substantially equivalent.

First Embodiment

Figure 1:
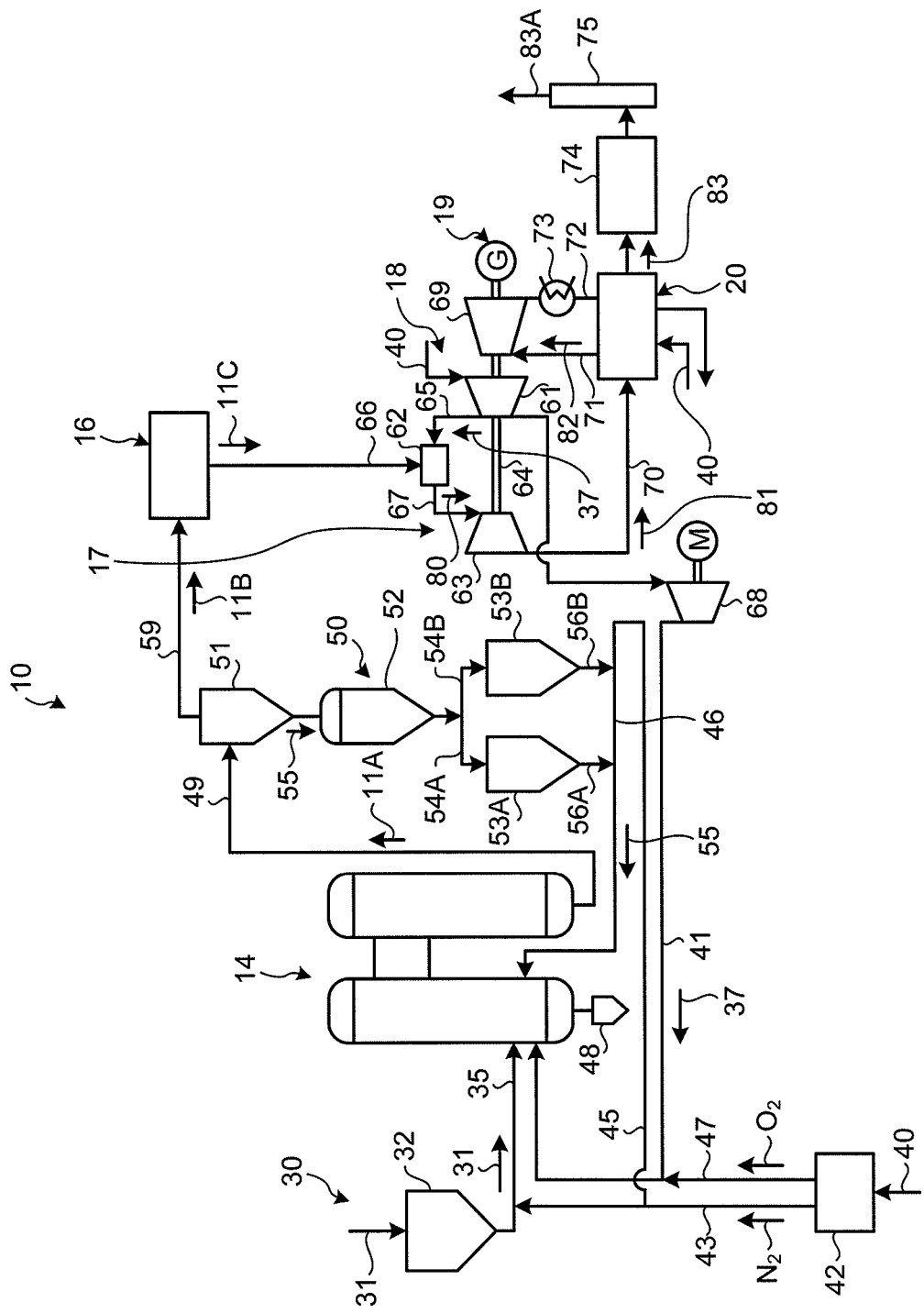
FIG. 1 is a schematic view of a coal gasification combined power generation facility provided with a char recovery system.

A coal gasification combined power generation facility provided with a char recovery system according to embodiments of the present invention will be described with reference the drawings. FIG. 1 is a schematic view of a coal gasification combined power generation facility provided with a char recovery system.

In the first embodiment, as illustrated in FIG. 1, a coal gasification combined power generation facility 10 includes a pulverized coal feeding facility 30 that feeds pulverized coal 31 obtained by pulverizing coal as raw material, a coal gasifier 14 that receives pulverized coal 31 and gasifies the pulverized coal 31 to generate product gas (combustible gas) 11A, a char recovery system 50 that recovers char 55 from the product gas 11A which is gasified gas, a gas purification unit 16 that purifies product gas 11B from which the char 55 has been removed, a gas turbine facility 17 that burns purified fuel gas 11C to drive a turbine, a steam turbine (ST) facility 18 that is driven by steam 82 generated in a heat recovery steam generator (HRSG) 20 that introduces thereinto turbine flue gas 80 from the gas turbine facility 17, and a generator (G) connected to the gas turbine facility 17 and/or the steam turbine facility 18.

The pulverized coal feeding facility 30 according to the present embodiment pulverizes raw coal (e.g., coal, brown coal, etc.) from a not illustrated row coal bunker to obtain pulverized coal 31 and feeds the pulverized coal 31 to the coal gasifier 14 from a pulverized coal bunker 32.

The coal gasifier 14 can receive the pulverized coal 31 from the pulverized coal bunker 32.

That is, the coal gasifier 14 is connected with a compressed air feeding line 41 extending from the gas turbine facility 17 (compressor 61), and thus compressed air 37 compressed in the gas turbine facility 17 can be fed to the coal gasifier 14. An air separator 42 separately generates nitrogen ($N_2$) and oxygen ($O_2$) from air 40 in the atmosphere, and a first nitrogen feeding line 43 extends therefrom to be connected to the coal gasifier 14. Further, a second nitrogen feeding line 45 extends from the air separator 42 to be connected to the coal gasifier 14. Further, the second nitrogen feeding line 45 is connected with char discharge lines 56A and 56B that feed back, from char feeding hoppers 53A and 53B, the char 55 recovered from the char recovery system 50. Furthermore, an oxygen feeding line 47 is connected to the compressed air feeding line 41. In this case, the nitrogen ($N_2$) is used as carrier gas for the pulverized coal 31 and char 55, and the oxygen ($O_2$) is used as oxidant.

Although the char 55 is fed to the coal gasifier 14 in the present embodiment, the char 55 recovered by the char recovery system 50 may be fed to the coal gasifier 14 after being mixed with the pulverized coal 31.

The coal gasifier 14 is a gasifier of, e.g., an entrained bed type. This coal gasifier 14 burns/gasifies the received pulverized coal 31, char 55, air (oxygen), or steam as gasifying agent and, at the same time, generates the product gas 11A mainly containing carbon monoxide to cause gasification reaction using the product gas 11A as gasifying agent. The coal gasifier 14 is provided with a foreign matter remover 48 that removes foreign matters such as molten slag in which the pulverized coal 31 is mixed.

Although the entrained bed type gasifier is exemplified as the coal gasifier 14 in the present embodiment, the present invention is not limited to this, but a coal gasifier of a fluid bed type or a fixed bed type may be used. The coal gasifier 14 is provided with a gas generation line 49 for the product gas 11A extending therefrom to the char recovery system 50 and can thus discharge the product gas 11A containing the char 55. In this case, a gas cooler may be provided for the gas generation line 49 so as to cool the product gas 11A to a predetermined temperature before feeding thereof to the char recovery system 50.

The char recovery system 50 includes separation means 51 for separating the char 55 which is unreacted pulverized coal 31 from the product gas 11A, a char bin 52 that recovers the separated char 55, char discharge lines 54A and 54B that feed the recovered char 55 to two char feeding hoppers 53A and 53B, respectively, in the present embodiment, and char discharge lines 56A and 56B that carry the char 55 from the char feeding hoppers 53A and 53B to the coal gasifier 14 side.

In the present embodiment, measurement of a variation (feeding amount/discharge amount) in an amount of the char 55 to be fed to the char feeding hoppers 53A and 53B is performed by volume measurement that measures a space deposition amount.

That is, an amount of the char in the char recovery system 50 is measured not based on measurement of a weight of the char feeding hopper, which has conventionally been performed, but by volume (level) measurement, thereby eliminating the need to measure the weight including the hopper weight which is much heavier than the weight of the powder to be originally measured.

In the present embodiment, a char level in each of the char feeding hoppers 53A and 53B is measured by means of a non-contact type level meter, and a char volume is calculated based on the measured char level.

Although it is preferable to measure the char level by means of a level meter of an electrostatic capacitance type or a level meter using γ-rays, the present invention is not limited to this, but any type of meter can be used as long as it can measure a volume.

The level meter using γ-rays includes a radiation source section that emits γ-rays and a γ-ray detector that detects the emitted γ-rays.

For example, 50 t/h char feeding level is measured in the char feeding hopper having a height of 8 m, it is sufficient to measure 0.23 mm/0.1 sec. (2.3 mm/sec), allowing accurate volume measurement.

As a result, without measuring the weights of the char feeding hoppers 53A and 53B of the char recovery system 50 using a load cell, it is possible to achieve control of reintroduction of the char into the gasifier such that a total volume of the char in a char system is kept constant by measuring the volume (level).

Thus, according to the char recovery system 50 of the present invention, it is possible to simplify configurations of a frame and piping, or the like for accurate measurement of the char weight and to facilitate hopper design and installation therefor.

Specifically, a rigid frame not bent by weight, arrangement for uniformly applying weight to a plurality of load cells, a pressure balancing type joint for absorbing/correcting pressure reactive force, a special load cell for measuring weighting due to thermal elongation, and the like all become unnecessary, thereby allowing reduction in initial installation cost.

The separation means 51 is constituted by a single or a plurality of bag filters or cyclones and can separate the char 55 contained in the product gas 11A generated in the coal gasifier 14. The product gas 11A from which the char 55 has been separated is fed to the gas purification unit 16 through a gas discharge line 59. The char feeding hoppers 53A and 53B each store the char 55 separated from the product gas 11A by the separation means 52. The char discharge lines 56A and 56B extending respectively from the char feeding hoppers 53A and 53B are connected to the second nitrogen feeding line 45.

The gas purification unit 16 removes impurities such as a sulfuric compound or a nitrogen compound from the product gas 11B from which the char 55 has been separated by the char recovery system 50 to perform gas purification. The gas purification unit 16 purifies the product gas 11B from which the char 55 has been separated to produce fuel gas 11C and feeds the fuel gas 11C to the gas turbine facility 17. In the gas purification unit 16, sulfur content ($H_2S$) is still contained in the product gas 11B from which the char 55 has been separated. Thus, the remaining sulfur content is removed by, e.g., amine absorption liquid and is finally recovered as calcium sulfate to be utilized effectively.

The gas turbine facility 17 includes a compressor 61, a combustor 62, and a turbine 63, and the compressor 61 and turbine 63 are connected to each other by a rotary shaft 64. The combustor 62 is connected with a compressed air feeding line 65 extending from the compressor 61 and connected with a fuel gas feeding line 66 extending from the gas purification unit 16. The turbine 63 is connected with a flue gas feeding line 67. Further, the gas turbine facility 17 is provided with the compressed air feeding line 41 extending from the compressor 61 to the coal gasifier 14, and a booster 68 is provided in the middle of the compressed air feeding line 41. Thus, the combustor 62 mixes the compressed air 37 fed from the compressor 61 and turbine flue gas 80 fed from the gas purification unit 16 and burns the mixture, and the turbine 63 rotates the rotary shaft 64 by the generated turbine flue gas 80 to thereby drive a generator 19.

The steam turbine facility 18 includes a turbine 69 connected to the rotary shaft 64 of the gas turbine facility 17, and the generator 19 is connected to a base end of the rotary shaft 64. The heat recovery steam generator 20 is provided in an exhaust gas line 70 extending from the gas turbine facility 17 (turbine 63) and performs heat exchange between the air 40 and high temperature exhaust gas 81 to thereby generate steam 82. Thus, the heat recovery steam generator 20 is provided with a steam feeding line 71 for feeding the steam 82 to the turbine 69 of the steam turbine facility 18 and further provided with a steam recovery line 72, in which a condenser 73 is provided. Thus, in the steam turbine facility 18, the turbine 69 is driven by the steam 82 fed from the heat recovery steam generator 20 to rotate the rotary shaft 64 to thereby rotate the generator 19.

An exhaust gas 83 whose heat has been recovered by the heat recovery steam generator 20 is fed to a gas purification unit 74 where it is subjected to removal of toxic substances. The purified exhaust gas 83A is released to the atmosphere through a stack 75.

The following describes operation of the coal gasification combined power generation facility 10 of the first embodiment.

In the coal gasification combined power generation facility 10 of the first embodiment, the pulverized coal 31 stored in the pulverized coal bunker 32 are fed, through a dried coal feeding line 35, to the coal gasifier 14 by the nitrogen fed from the air separator 42. Meanwhile, the char 55 recovered in the char recovery system 50 to be described later is fed, through a char return line 46, to the coal gasifier 14 by the nitrogen fed from the air separator 42. Further, the compressed air 37 bled from the gas turbine facility 17 to be described later is boosted in the booster 68 and is then fed, through the compressed air feeding line 41 to the coal gasifier 14, together with the oxygen fed from the air separator 42.

The coal gasifier 14 burns the fed pulverized coal 31 and char 55 with the compressed air (oxygen) 37 to gasify them to thereby produce the product gas 11A mainly containing carbon dioxide. The product gas 11A is discharged from the coal gasifier 14 and is fed to the char recovery system 50 through the gas generation line 49.

In the char recovery system 50, the product gas 11A is first fed to the separation means 51, where the char 55 contained in the product gas 11A is separated therefrom. The product gas 11B from which the char 55 has been separated is fed to the gas purification unit 16 through the gas discharge line 59. Meanwhile, the fine particle char 55 separated from the product gas 11A is fed to the char feeding hoppers 53A and 53B through the char bin 52 to be deposited therein and returned to the coal gasifier 14 through the char return line 46 for recycle.

The product gas 11B from which the char 55 has been separated by the char recovery system 50 is subjected to removal of impurities such as a sulfuric compound or a nitrogen compound in the gas purification unit 16 to be purified, whereby the fuel gas 11C is produced. Then, in the gas turbine facility 17, the compressor 61 generates the compressed air 37 and feeds it to the combustor 62, and the combustor 62 mixes the compressed air 37 fed from the compressor 61 and the fuel gas 11C fed from the gas purification unit 16 and burns the mixture to produce the flue gas 80. Then, the turbine 63 is driven by the flue gas 80, causing the generator 19 to be driven through the rotary shaft 64, whereby power is generated.

The exhaust gas 81 discharged from the turbine 63 in the gas turbine facility 17 is heat-exchanged with the air 40 in the heat recovery steam generator 20 to produce the steam 82, which is then fed to the steam turbine facility 18. In the steam turbine facility 18, the turbine 69 is driven by the steam 82 fed from the heat recovery steam generator 20, causing the generator 19 to be driven through the rotary shaft 64, whereby power is generated.

Thereafter, in the gas purification unit 74, toxic substances in the exhaust gas 83 discharged from the heat recovery steam generator 20 is removed, and the purified exhaust gas 83A is released to the atmosphere through the stack 75.

Second Embodiment

Figure 2:
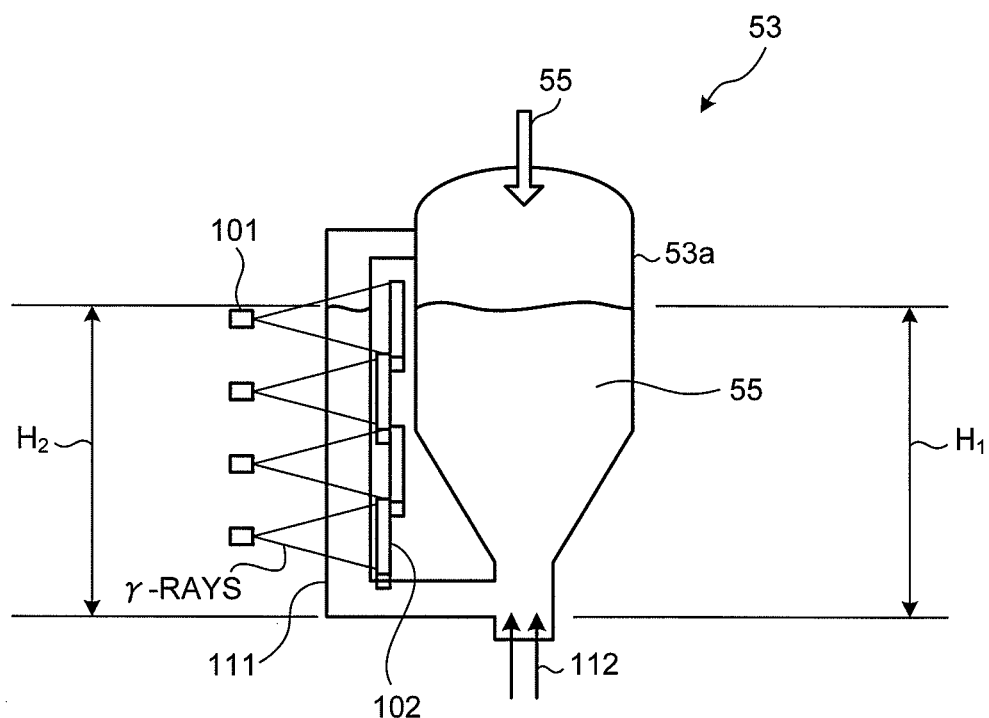
FIG. 2 is a schematic view of a char feeding hopper according to a second embodiment.
Figure 3:
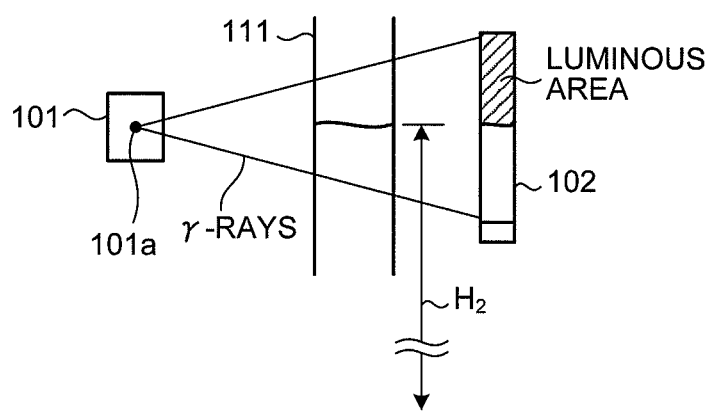
FIG. 3 is a schematic view of an example of measurement of γ-rays.

A char feeding hopper according to a second embodiment of the present invention used in the char recovery system will be described with reference to the drawings. FIG. 2 is a schematic view of a char feeding hopper according to the second embodiment. FIG. 3 is a schematic view of an example of measurement of $\gamma$-rays.

As illustrated in FIG. 2, a char feeding hopper 53 according to the second embodiment includes a char feeding hopper body 53a that feeds the separated char 55 to the coal gasifier side, a char communicating tube 111 that communicates with a bottom portion of the char feeding hopper body 53a and is extended vertically, fluid gas feeding means (not illustrated) that is provided at the bottom portion side of the char feeding hopper body 53a and feeds fluid gas 112 to an inside thereof, a radiation source section 101 that emits $\gamma$-rays toward an inside of the char communicating tube 111 in which a level of the char 55 reaches a level $H_2$ which is the same level as a level $H_1$ of the char 55 in the char feeding hopper 53 as a result of feeding of the fluid gas 112, and a $\gamma$-ray detector 102 that detects the emitted $\gamma$-rays.

In the present embodiment, the char communicating tube 111 extending from a lower portion of the char feeding hopper body 53a is provided, and the fluid gas feeding means for introducing, from a lower portion of the char communicating tube 111, the fluid gas 112 used for fluidizing particles of the char 55 in the char feeding hopper body 53a is provided.

As a result, the particles of the char 55 are fluidized, so that the levels of powder layers of the char 55 in the char feeding hopper body 53a and the char 55 in the char communicating tube 111 become the same level ($H_1 = H_2$).

Further, as detection means for detecting the powder layer level $H_2$ inside the char communicating tube 111, there are provided the radiation source section 101 that emits $\gamma$-rays and the $\gamma$-ray detector 102 that is provided along a vertical axis direction of the char communicating tube 111 and detects the emitted $\gamma$-rays.

The $\gamma$ (gamma)-rays are electromagnetic waves that are emitted during changes in a state of nucleus of a radioisotope, and this $\gamma$-rays can be detected using the $\gamma$-ray detector 102.

For example, the γ-ray detector 102 can use a scintillation detector and is constituted by a scintillator and a photomultiplier tube.

As illustrated in FIG. 3, the scintillator emits light (luminous area) by the incident radiation, and the emitted light is converted into electron by a photocathode of the photomultiplier tube. The electron is amplified by high voltage and is detected as an electric signal.

In a case where the radiation source section 101 and γ-ray detector 102 are disposed with the char communicating tube 111 interposed therebetween, γ-rays are emitted from the radiation source section 101 toward the γ-ray detector 102, and the γ-rays that has entered the γ-ray detector 102 is detected as an electric signal.

Then, using a difference in density caused due to transmission of γ-rays between presence and absence of the char 55, the powder layer level $H_2$ of the char 55 can be measured.

A length of the char communicating tube 111 is increased depending on a volume of the char feeding hopper body 53a, so that a plurality of the radiation source sections 101 and γ-ray detectors 102 are arranged in the vertical axis direction as needed.

In the configuration described above, the fluid gas 112 is introduced from the lower portion of the char feeding hopper body 53a.

The introduction of the fluid gas 112 fluidizes the char (powder) 55 in the char feeding hopper body 53a, allowing the powder to act as if it were liquid.

Since the char 55 in the char feeding hopper body 53a act as liquid, the powder layer level $H_1$ of the char 55 in the hopper and the powder layer level $H_2$ of the char 55 in the char communicating tube 111 communicating with the lower portion of the hopper become the same level.

It is desirable that the fluid gas 112 to be introduced assumes the following configurations depending on atmosphere conditions:

(a) A gas introduction velocity is equal to or higher than an initial fluidization velocity of the char 55 and equal to or less than terminal velocity.

(b) Under the gasification atmosphere, inert gas (e.g., nitrogen) in which a concentration of oxygen in assist gas is 3% or less is used.

(c) Means (e.g., discharge tube, pressure reducing line, or the like) for discharging the assist gas is installed.

By connecting the char communicating tube 111 to the lower portion of the char feeding hopper body 53a and introducing the fluid gas 112 for fluidizing the char 55 from below the connection portion between the char feeding hopper body 53a and the char communicating tube 111, it is possible to measure the char level in the connected char communicating tube 111.

The char feeding hopper 53 may be increased in vessel thickness for responding to an increase in pressure applied thereto or an increase in size of the hopper, with the result that the level detection from outside by using, e.g., the γ-rays becomes difficult. However, in the case of the char communicating tube 111 connected to the lower portion of the char feeding hopper body 53a, the tube thickness can be made thin, thereby facilitating measurement using the level detection means.

This allows use of a simple measurement instrument with a small dose of γ-rays, facilitating the measurement.

As a result, it is possible to easily measure the volume of the char in the char feeding hopper 53 without using the conventional weight measurement method using the load cell.

Although the γ-ray level meter is used in the present embodiment, a level meter of an electrostatic capacitance type may be used.

Third Embodiment

Figure 4:
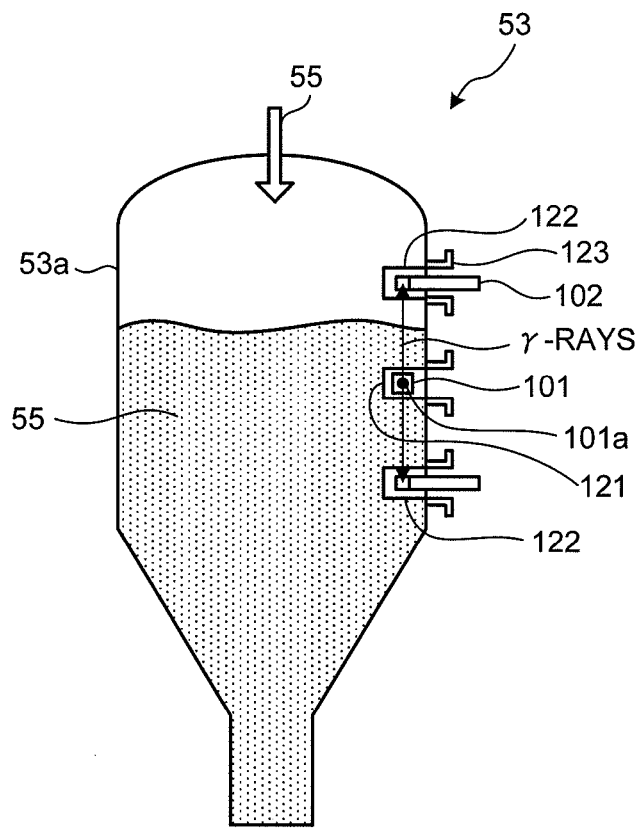
FIG. 4 is a schematic view of a char feeding hopper according to a third embodiment.
Figure 5:
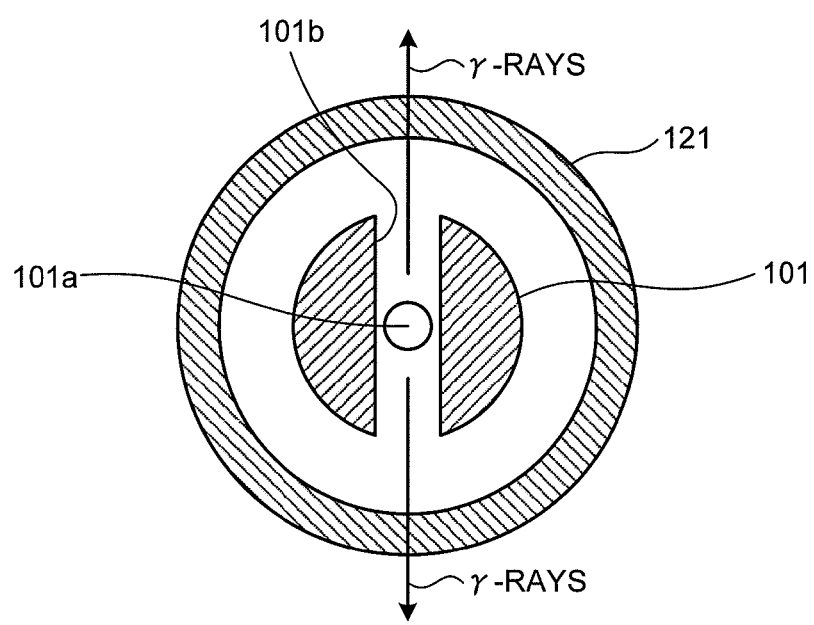
FIG. 5 is a schematic view of a first casing tube having a radiation source section.
Figure 6:
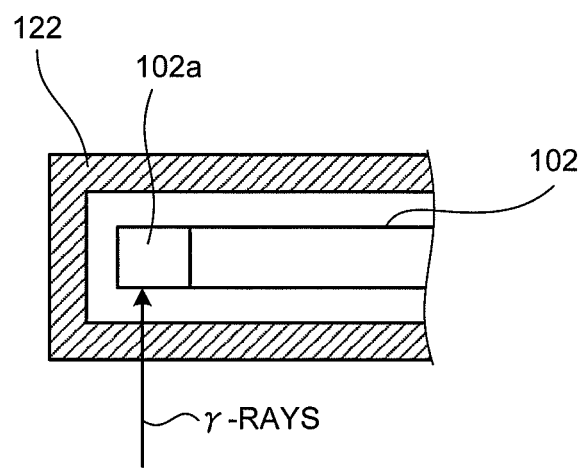
FIG. 6 is a schematic view of a second casing tube having a γ-ray detector.
Figure 7:
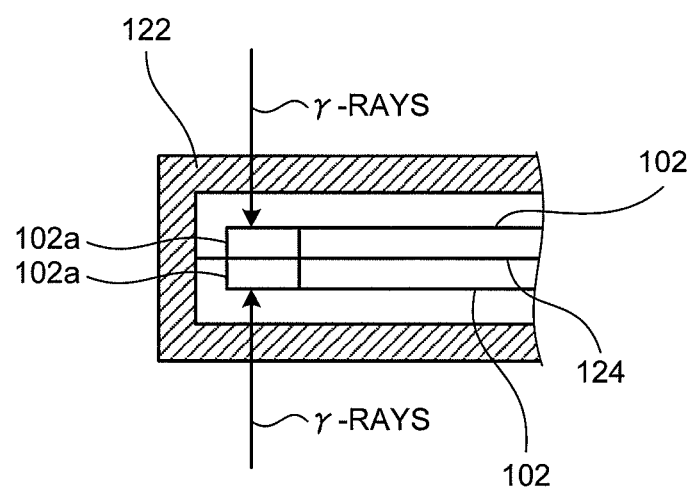
FIG. 7 is another schematic view of the second casing tube having the γ-ray detector.

A char feeding hopper according to a third embodiment of the present invention used in the char recovery system will be described with reference to the drawings. FIG. 4 is a schematic view of a char feeding hopper according to the third embodiment. FIG. 5 is a schematic view of a first casing tube having a radiation source section. FIG. 6 is a schematic view of a second casing tube having a γ-ray detector. FIG. 7 is another schematic view of the second casing tube having the γ-ray detector.

As illustrated in FIG. 4, the char feeding hopper 53 according to the third embodiment includes a char feeding hopper body 53a that feeds the separated char 55 to the coal gasifier side, a first casing tube 121 inserted into the char feeding hopper body 53a through a side wall thereof, a radiation source section 101 provided in the first casing tube 121 and emits γ-rays toward an inside of the char feeding hopper body 53a, a second casing tube 122 provided above or below the first casing tube 121 in a vertical axis direction thereof and inserted into the char feeding hopper body 53a through the side wall thereof, and a γ-ray detector 102 provided in the second casing tube 122 and detects the emitted γ-rays.

The first and second casing tubes 121 and 122 are each installed on a tube base 123 provided at the side wall of the char feeding hopper body 53a.

As illustrated in FIG. 5, the radiation source section 101 having a radiation source 101a is inserted into the first casing tube 121.

As illustrated in FIG. 6, the γ-ray detector 102 having a detection section 102a is inserted into the second casing tube 122.

A plurality of the first and second casing tubes 121 and 122 for shielding pressure are installed in the char feeding hopper body 53a so as to be arranged in the vertical axis direction thereof, and the radiation source section 101 having the radiation source 101a that emits γ-rays for use in detection of the powder layer level and the γ-ray detector 102 that detects the emitted γ-rays are installed in the casing tubes 121 and 122, respectively.

The number of radiation source sections 101 and γ-ray detectors 102 may be increased in accordance with a level range (height) of the char 55.

That is, in a case where the level range is small, it is only necessary to provide a set of the radiation source section 101 and γ-ray detector 102.

When the level range exceeds a measurement range that is covered by the set of the radiation source section 101 and γ-ray detector 102, there are provided the set of the radiation source section 101 (having upper and lower emission holes) and γ-ray detector 102 and another γ-ray detector 102, as illustrated in FIG. 4.

As illustrated in FIG. 5, the radiation source section 101 having the upper and lower emission holes has a radiation hole 101b passing through a center of the radiation source 101a and opened only in the vertical axis direction and is configured to emit the γ-rays in the up and down direction.

When the level range is large, another radiation source section 101 may be provided in the vertical direction of the configuration as illustrated in FIG. 4 in which the two γ-ray detectors 102 and one radiation source section 101 (having upper and lower emission holes) are provided. In this case, as illustrated in FIG. 7, a lead partition wall 124 is provided in the second casing tube 122 to form two γ-ray detectors 102 so as to allow detection of both the upper and lower directions.

A plurality of the tube base 123 are installed in the side surface of the vessel of the char feeding hopper body 53a so as to be arranged in the vertical direction of the char feeding hopper body 53a, the first and second casing tubes 121 and 122 are installed in the tube base 123, respectively, and a plurality of level meters composed of the radiation source section 101 and γ-ray detector 102 installed inside the casing tubes, whereby the level of the char 55 can be measured in a non-contact manner.

When the vessel thickness of the char feeding hopper 53 is increased for responding to an increase in pressure applied thereto or an increase in size of the hopper to make difficult the level detection from outside, the casing tubes are provided in the side wall of the char feeding hopper body 53a, and the γ-ray radiation source section 101 and γ-ray detector 102 are inserted into the respective casing tubes. This allows a reduction in tube (casing tube) thickness, thereby enabling measurement using the level detection means.

As a result, it is possible to measure the amount of the char 55 in the char feeding hopper 53 without using the conventional load cell.

Further, in the third embodiment, a cooling means may be provided in each of the first and second casing tubes 121 and 122.

Cooling of the casing tube may be achieved using coolant (e.g., gas cooling or liquid cooling) or electronic cooling. However, it is preferable to use cooling means that keeps surface temperatures of the first and second casing tubes 121 and 122 installed in the char feeding hopper body 53a at a temperature equal to or more than a dew point inside the vessel.

As described above, by providing the cooling means in each of the first and second casing tubes 121 and 122, it is possible to measure the level of the char 55 even when a char temperature exceeds a heatproof temperature of the detection means.

Figure 8:
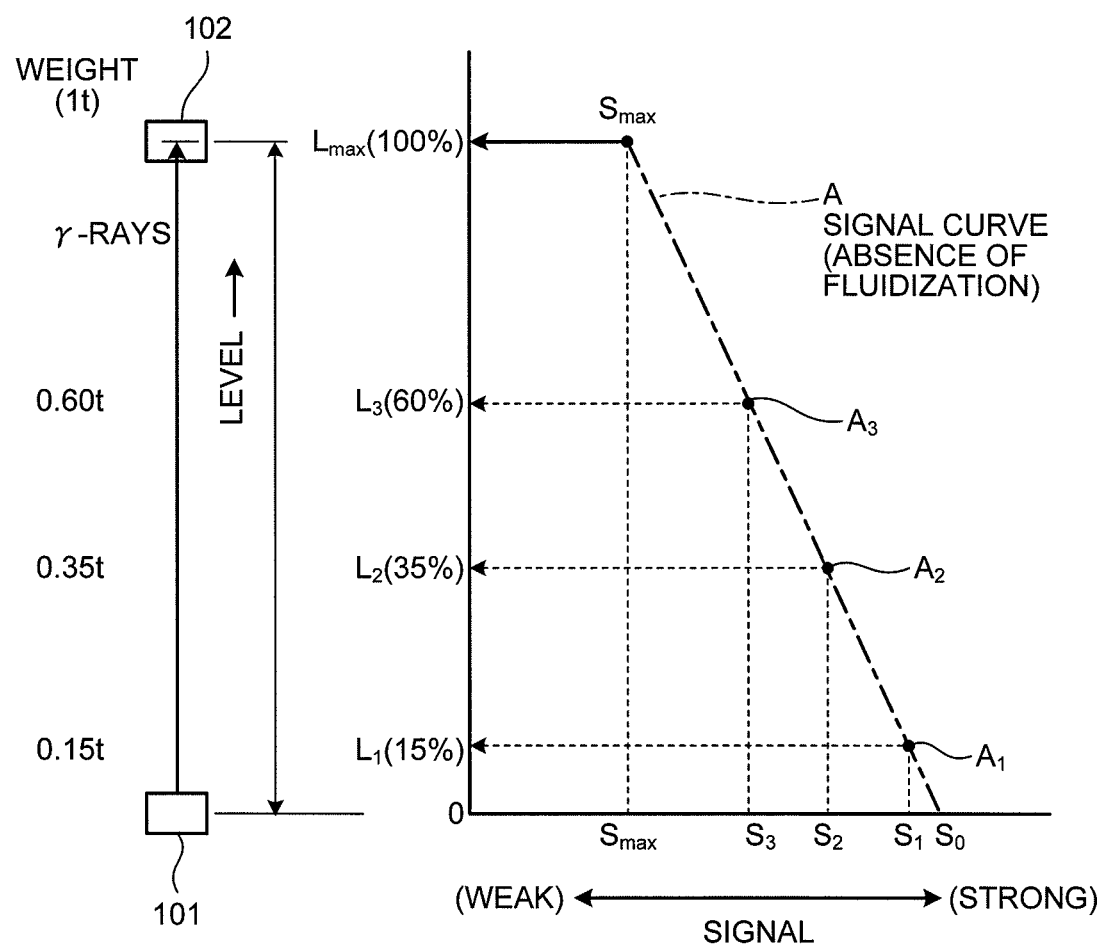
FIG. 8 is a view illustrating a relationship between a measurement γ-ray signal using γ-rays and level.
Figure 9:
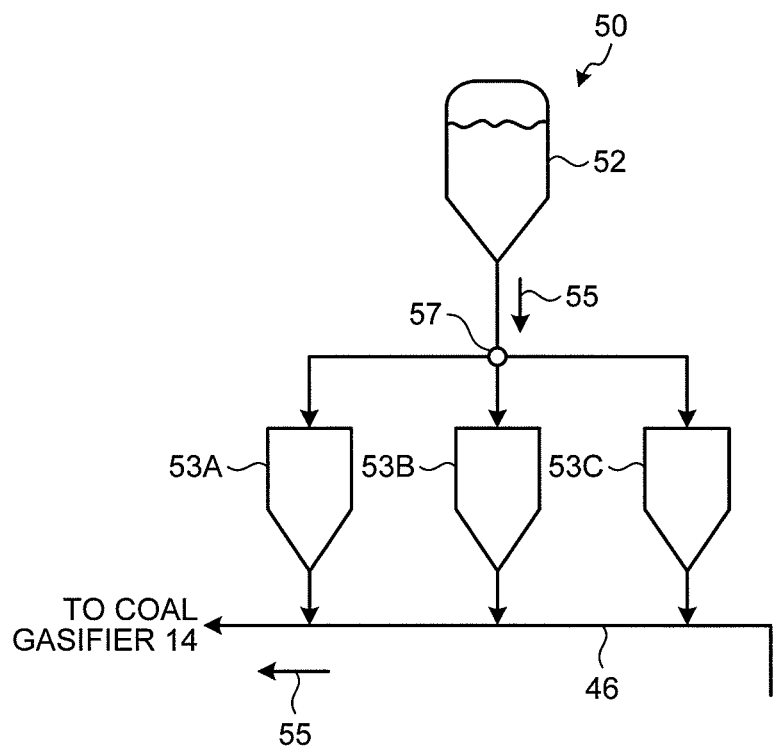
FIG. 9 is a schematic view illustrating a char recovery system using a plurality of (three) char feeding hoppers.
Figure 10:
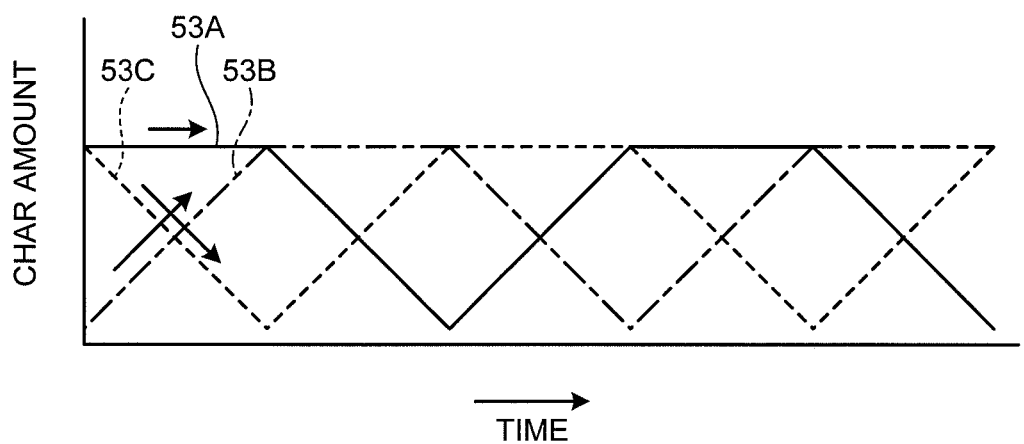
FIG. 10 is a schematic view illustrating a char feeding/storage/delivery state of the char in each of the three char feeding hoppers.
Figure 11:
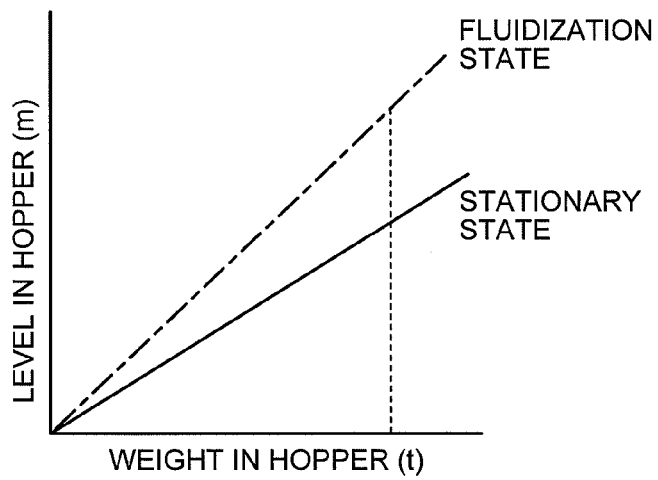
FIG. 11 is a view illustrating a relationship between a weight (t) inside the hopper and a level (m) inside the hopper both in a case where the char is not fluidized and where the char is fluidized.

FIG. 8 is a view illustrating a relationship between a measurement γ-ray signal using the γ-rays and the level. FIG. 9 is a schematic view illustrating a char recovery system using a plurality of (three) char feeding hoppers. FIG. 10 is a schematic view illustrating a char feeding/storage/delivery state of the char in each of the three char feeding hoppers. FIG. 11 is a view illustrating a relationship between a weight (t) inside the hopper and a level (m) inside the hopper both in a case where the char 55 is not fluidized and where the char 55 is fluidized.

Figure 12:
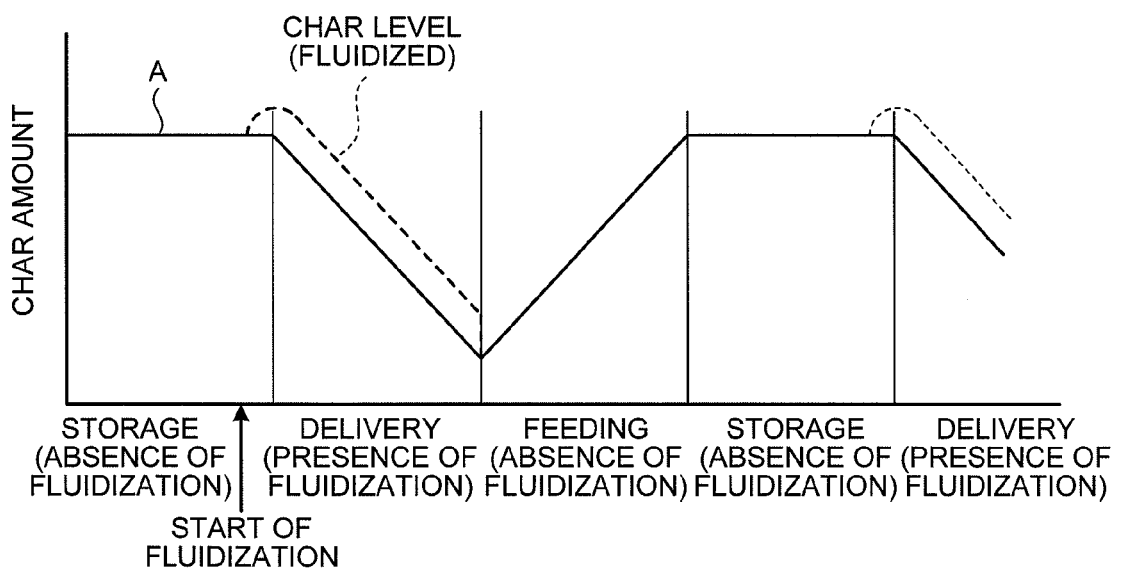
FIG. 12 is a schematic view illustrating a change in the char feeding/storage/delivery state of one char feeding hopper with the fluidized state taken into consideration.

FIG. 12 is a schematic view illustrating a change in the char feeding/storage/delivery state of one char feeding hopper with the fluidized state taken into consideration.

FIG. 8 illustrates an example in which γ-ray measurement is performed using the char feeding hopper 53 of FIG. 4. A vertical axis represents a level (%), and a horizontal axis represents a γ-ray signal intensity.

In FIG. 8, $S_0$ represents a position of zero-point of the radiation source section 101, at which the signal intensity is highest in the absence of the char.

$S_{max}$ represents a level position of the γ-ray detector 102, at which the signal intensity is lowest with γ-rays attenuation due to presence of the char in a state where the hopper is full of the char.

$S_1, S_2, S_3, \ldots$ each represent a level at each measurement point when the char is fed (e.g., $S_1=15\%$, $S_2=35\%$, $S_3=600$).

The measurement level is previously converted into the weight, whereby the weight can be obtained from the measurement level as follows: assuming that $L_{max}$ of 100% corresponds to 1 t, $S_i=15\% (L_1)=0.15$ t, $S_2=35\% (L_2)=0.35$ t, and $S_3=60\% (L_3)=0.60$ t.

By the way, when the char is fed to the char feeding hopper 53, the char 55 is continuously fed inside the hopper in unchanged form.

On the other hand, when the char 55 is delivered to the gasifier through the char return line 46, the char 55 is delivered thereto in a fluidized state for achievement of high feeding stability.

Specifically, when three (first hopper 53A, second hopper 53B, and third hopper 53C) char feeding hoppers 53 are provided as illustrated in FIG. 9, a switch section 57 performs control such that a char feeding process, a char storage process, and a char delivery process are alternately repeated in each hopper, as illustrated in FIG. 10.

For example, in FIG. 10, the first hopper 53A is in the char storage state in which the feeding of the char 55 is completed, the second hopper 53B is in a state where the char 55 is being fed thereto, and the third hopper 53C is in a state where the char 55 is being delivered therefrom. These processes are alternately repeated.

In this configuration, the char is fed inside the hopper 53B by an amount corresponding to a delivery amount of the char 55 from the third hopper 53C, that is, the delivery amount and feeding amount are always kept constant to achieve a balance therebetween.

In delivering the char 55, for increasing fluidity of the char 55, the fluid gas 112 is fed inside the first hopper 53A. As a result of this fluidization, the gas is fed to the stored char 55, and a volume of the char 55 is increased to make the level of the char 55 in the hopper higher, as illustrated in FIG. 11.

More specifically, focusing on the char level in the first hopper 53A illustrated in FIG. 12, the char level in the hopper is constant in a stationary state; however, when the fluidization is started by feeding of the fluid gas 112, the char level is abruptly increased to make it impossible to grasp the actual delivery amount (weight) simply by measuring the level value.

To cope with this, a standard curve in the fluidized state is previously calculated, and the char is fed inside the second hopper 53B while checking the current actual char amount (weight) and the char delivery amount.

The variation in the char volume varies with a change in a flow rate of the fluid gas for fluidizing the char and a change in composition of a pulverized coal raw material, so that, preferably, standard curves responding to a plurality of fluidized states are previously calculated for subsequent fine adjustment.

Fourth Embodiment

Figure 13:
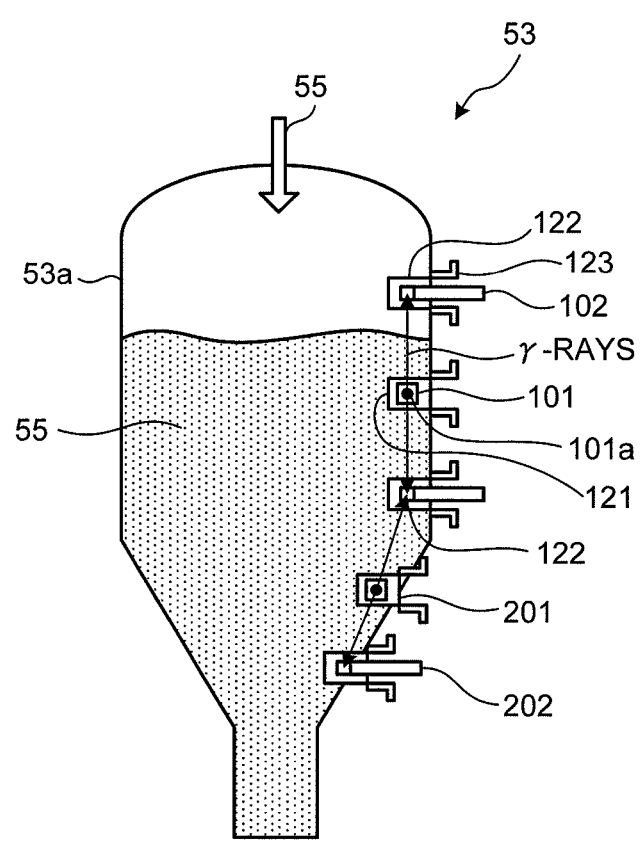
FIG. 13 is a schematic view of a char feeding hopper according to a fourth embodiment.
Figure 14:
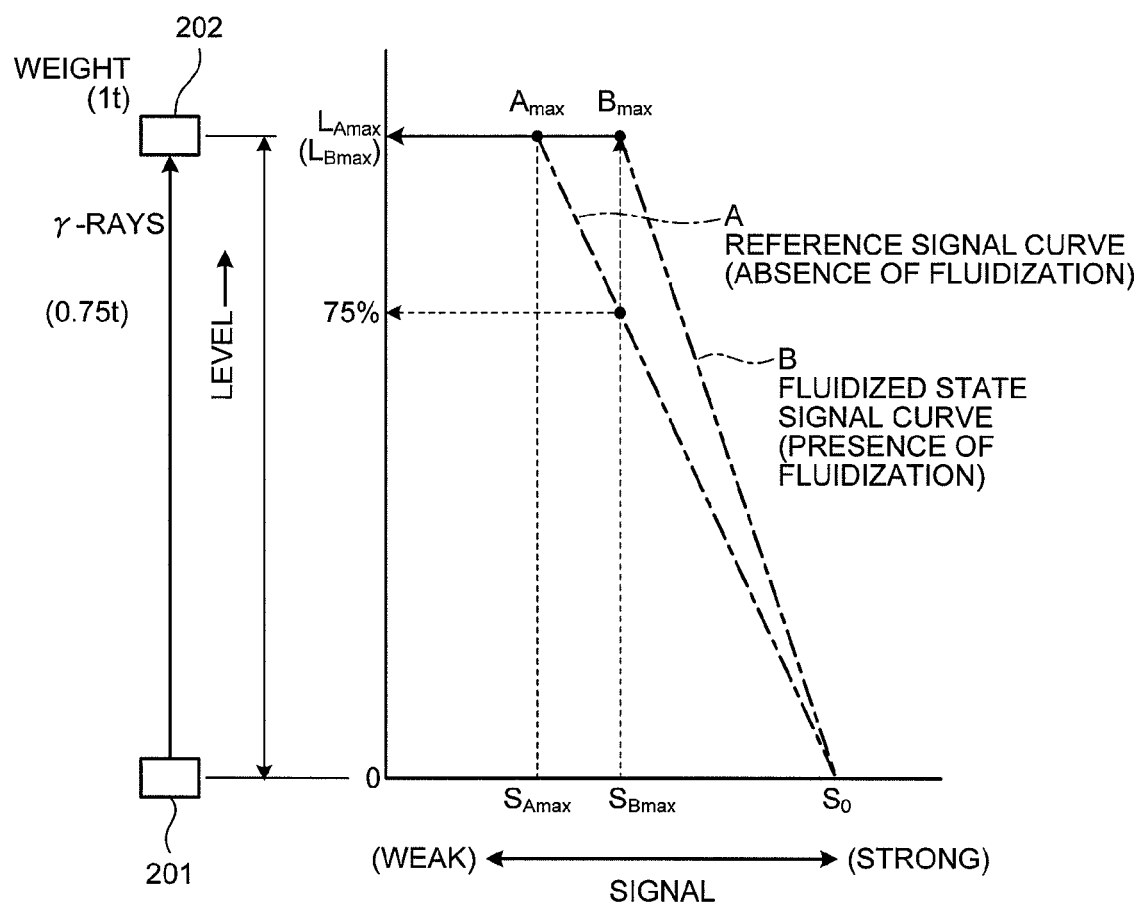
FIG. 14 is a view illustrating a relationship between the γ-ray signal and the level both in a case where the char is not fluidized and where the char is fluidized.

A char feeding hopper according to a fourth embodiment of the present invention used in the char recovery system will be described with reference to the drawings. FIG. 13 is a schematic view of a char feeding hopper according to the fourth embodiment. FIG. 14 is a view illustrating a relationship between the γ-ray signal and the level both in a case where the char is not fluidized and where the char is fluidized.

Figure 15:
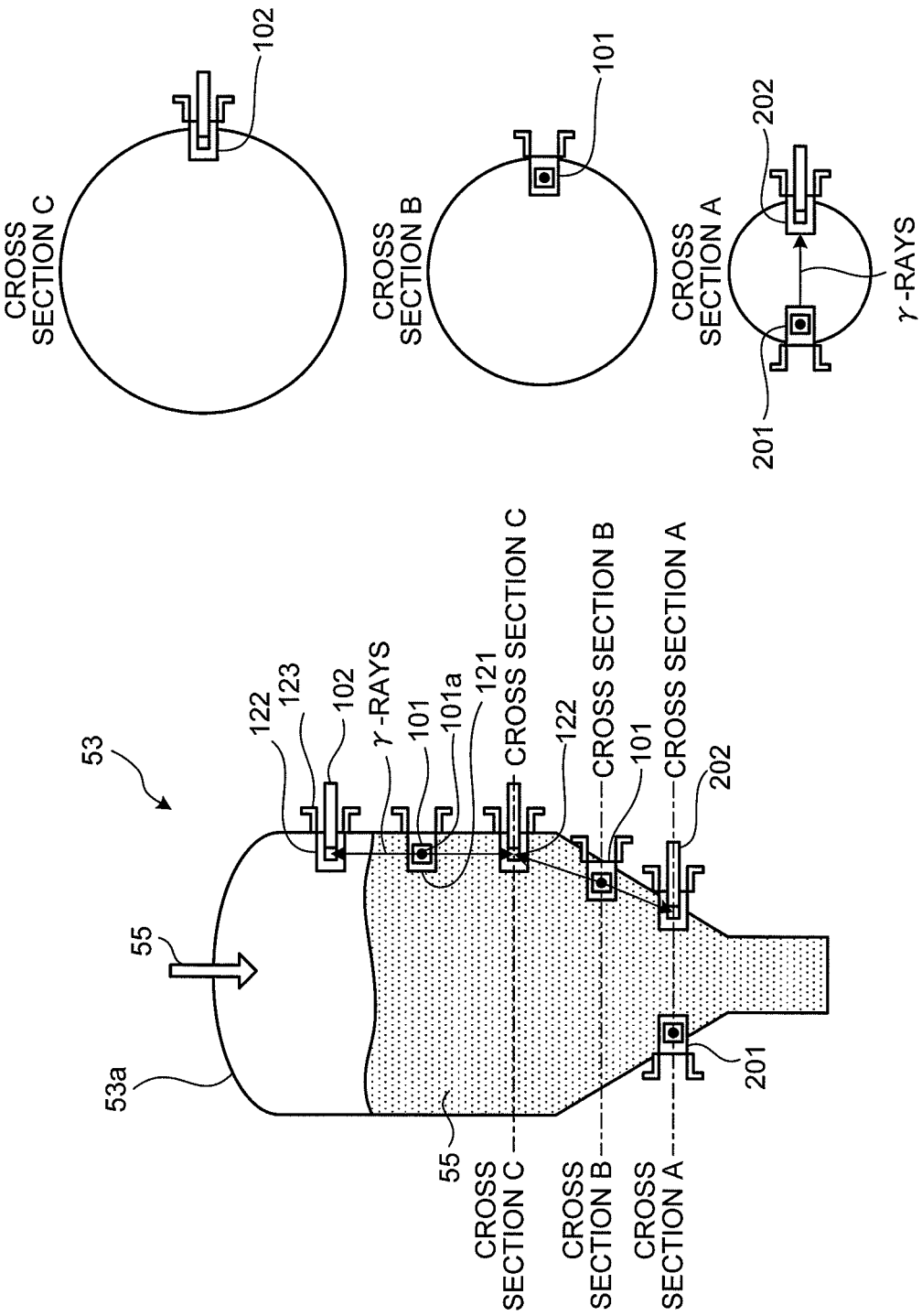
FIG. 15 is a schematic view of another char feeding hopper according to the fourth embodiment.

FIGS. 15 and 16 are each a schematic view of another char feeding hopper according to the fourth embodiment.

In the char feeding unit illustrated in FIG. 13, a reference measurement level meter including a set of a γ-ray radiation source section 201 and a γ-ray detection section 202 is provided at the lower portion of the char feeding hopper 53, and a char measurement area between the γ-ray radiation source section 201 and the γ-ray detection section 202 is always filled with the char 55.

When the char fluidization is started, a reference signal between the set of the γ-ray radiation source section 201 and γ-ray detection section 202 is calculated, and, based on the reference signal, a reference signal curve A before the start of fluidization and a fluidized state signal curve B after the start of the fluidization are calculated.

The char becomes bulky after the start of the fluidization and, accordingly, a signal attenuation amount of the γ-rays becomes smaller than that when the char is not fluidized.

Then, in FIG. 14, a maximum level ($L_{max}$) of the fluidized state signal curve B is estimated to correspond to 75% of a level in the reference signal curve A, and a true weight in a fluidized state is derived from an attenuation amount of γ-ray signal $_{SBmax}$ in the fluidized state.

Since a distance between the set of the γ-ray radiation source section 201 and γ-ray detection section 202 is known, a signal in another detector can be corrected based on a signal obtained when the char particles exist between the γ-ray radiation source section 201 and γ-ray detection section 202.

As a result, higher accurate level (level of the deposition in the hopper) measurement is enabled, thereby allowing correction of a variation in level (weight variation is not varied) of the char in the hopper occurring depending on an operating state, which can lead to stable and smooth operation control.

In FIG. 14, when the char becomes bulky due to the fluidization, the level becomes 75%. Assuming that $L_{max}$ of 100% corresponds to 1 t, a true weight can be obtained such that $S_{Bmax}=75\%=0.75$ t.

As described above, by installing the reference measurement level meter, it is possible to quickly respond to a case where the variation in the char volume varies with a change in a flow rate of the fluid gas for fluidizing the char or a change in composition of a pulverized coal raw material.

In FIG. 13, the char feeding hopper 53 is configured in the lower portion thereof such that the char measurement area between the set of the γ-ray radiation source section 201 and γ-ray detection section 202 constituting the reference measurement level meter is always filled with the char 55.

As the reference measurement level meter of FIG. 13, the γ-ray radiation source section 201 and γ-ray detection section 202 are installed in the vertical direction; on the other hand, as a reference measurement level meter of FIG. 15, the γ-ray radiation source section 201 and 7-ray detection section 202 are installed in a horizontal direction. In FIG. 15 (and also in FIG. 16), cross sections A to C of the char feeding hopper 53 on the left side are illustrated on a right side of FIG. 15.

As illustrated in FIG. 15, as the reference level meter, a set of the reference γ-ray radiation source section 201 and reference γ-ray detection section 202 are installed in a direction perpendicular to the vertical direction, with the result that a position to be filled with the char 55 can be lowered. As a result, an effective capacity of the hopper can be increased further.

As with the reference measurement level meter in FIG. 16, as the reference measurement level meter, a set of the reference γ-ray radiation source section 201 and reference γ-ray detection section 202 are installed in a direction perpendicular to the vertical direction and, in addition, the radiation source section 101 for measurement and γ-ray detector 102 for measurement are installed, whereby the level measurement and measurement at the fluidized mode are separately performed.

This allows measurement of γ-rays for correction to be performed independently, whereby measurement of a signal for level measurement and level measurement for correction can be separately performed.

The same configuration as above is possible in the measurement using the char communicating tube 111 illustrated in FIG. 2.

For example, when there is a difference between the fluidization amount at the char feeding time and that at the char delivery time, a plurality of sets of the γ-ray radiation source section 101 and γ-ray detector 102 are installed vertically along the char communicating tube and, among the plurality of sets of the γ-ray radiation source section 101 and γ-ray detector 102, a set thereof on an introduction side of the fluid gas 112 is used to constitute a reference measurement level meter 200. Also, in this case, the char feeding hopper 53 is configured such that the char measurement area of the reference measurement level meter 200 is always filled with the char 55. With this configuration, the char level is corrected in accordance with a variation in the fluidized state to calculate a true char weight.

REFERENCE SIGNS LIST

10 COAL GASIFICATION COMBINED POWER GENERATION FACILITY
14 COAL GASIFIER
16 GAS PURIFICATION UNIT
17 GAS TURBINE FACILITY
18 STEAM TURBINE FACILITY
19 GENERATOR
20 HEAT RECOVERY STEAM GENERATOR
50 CHAR RECOVERY SYSTEM
53, 53A, 53B CHAR FEEDING HOPPER
53a CHAR FEEDING HOPPER BODY
55 CHAR
101 RADIATION SOURCE SECTION
101a RADIATION SOURCE
102 γ-RAY DETECTOR
111 CHAR COMMUNICATING TUBE
112 FLUID GAS
121 FIRST CASING TUBE
122 SECOND CASING TUBE

The invention claimed is:
1. A char recovery system for recovering char from product gas, the char being an unreacted carbonaceous raw material and the product gas being generated by gasification of the carbonaceous raw material in a gasifier, the char recovery system comprising:
   separation means for separating the char from the product gas;
   a char bin for recovering the separated char;
   a char discharge line for feeding the recovered char;
   at least one char feeding hopper for receiving the char from the char discharge line; and
   a char feeding line for feeding the char from the char feeding hopper toward the gasifier, wherein
   the char feeding hopper includes:
   a char feeding hopper body for feeding separated char toward the gasifier;
   a communicating tube for communicating with a bottom portion of the char feeding hopper body, the communicating tube extending in a vertical axis direction;
   fluid gas feeding means provided at a bottom portion side of the char feeding hopper body, for feeding fluid gas to an inside thereof; and
   a level meter for measuring a volume of the char in the char feeding hopper as a char amount (feeding amount/discharge amount), the level meter including:
   a radiation source section for emitting γ-rays toward an inside of the char communicating tube in which a level of the char reaches the same level as a level of the char in the char feeding hopper body as a result of feeding of the fluid gas; and a γ-ray detector provided in the vertical axis direction of the char communicating tube, for detecting the emitted γ-rays.

2. A char recovery system for recovering char from product gas, the char being an unreacted carbonaceous raw material and the product gas being generated by gasification of the carbonaceous raw material in a gasifier, the char recovery system comprising:

separation means for separating the char from the product gas;

a char bin for recovering the separated char;

a char discharge line for feeding the recovered char;

at least one char feeding hopper for receiving the char from the char discharge line; and a char feeding line for feeding the char from the char feeding hopper toward the gasifier, wherein the char feeding hopper includes:

a char feeding hopper body for feeding separated char toward the gasifier;

a first casing tube inserted into the char feeding hopper body through a side wall thereof:

a second casing tube provided at least above or below the first casing tube in a vertical axis direction thereof and inserted into the char feeding hopper body through the side wall thereof; and a level meter for measuring a volume of the char in the char feeding hopper as a char amount (feeding amount/discharge amount), the level meter including:

a radiation source section provided in the first casing tube, for emitting γ-rays toward an inside of the char feeding hopper body; and a γ-ray detector provided in the second casing tube, for detecting the emitted γ-rays.

3. The char recovery system according to claim 2, further comprising cooling means in each of the first and second casing tubes.

4. The char recovery system according to claim 1, wherein a plurality of sets of the γ-ray radiation source section and γ-ray detection section are installed vertically along the char communicating tube, among the plurality of sets of the γ-ray radiation source section and γ-ray detection section, a set thereof on an introduction side of fluid gas is used for constituting a reference measurement level meter, and a char measurement area of the reference measurement level meter is always filled with the char.

5. The char recovery system according to claim 2, wherein a reference measurement level meter including a set of the radiation source section and γ-ray detector is installed at a lower portion in the char feeding hopper body, and a char measurement area between the radiation source section and γ-ray detector is always filled with the char.

* * * * *